United States Patent [19]

West et al.

[11] Patent Number: 5,537,650
[45] Date of Patent: Jul. 16, 1996

[54] METHOD AND APPARATUS FOR POWER MANAGEMENT IN VIDEO SUBSYSTEMS

[75] Inventors: Roderick M. P. West, Colchester, Vt.; Kathryn E. Rickard, Romsey, United Kingdom; Richard J. Grupp, Milton, Vt.

[73] Assignee: International Business Machines Corporation, Armonk, N.Y.

[21] Appl. No.: 232,536

[22] Filed: Dec. 14, 1992

[51] Int. Cl.⁶ .................................................. G06F 13/00
[52] U.S. Cl. .................................................. 395/750
[58] Field of Search .................................. 395/750, 707; 364/707

[56] References Cited

U.S. PATENT DOCUMENTS

| | | | |
|---|---|---|---|
| 3,510,578 | 5/1970 | Bazin | 178/7.1 |
| 4,333,105 | 6/1982 | Kaku et al. | 358/67 |
| 4,549,214 | 10/1985 | Hinn | 358/172 |
| 4,583,121 | 4/1986 | Yost | 358/172 |
| 4,716,461 | 12/1987 | Hinn | 358/165 |
| 4,825,388 | 4/1989 | Dailey et al. | 364/518 |
| 5,167,024 | 11/1992 | Smith et al. | 395/375 |
| 5,270,687 | 12/1993 | Killebrew, Jr. | 345/150 |
| 5,289,575 | 2/1994 | Godfrey | 395/162 |
| 5,375,209 | 12/1994 | Maher et al. | 395/275 |

OTHER PUBLICATIONS

"82C426", CGA LCD/CRT Controller, Chips and Technologies, copyright 1990.

Eagle, D. J. & Morrish, A. J., "Increasing Lifetime and Reliability of CRT Displays", IBM Technical Disclosure Bulletin, vol. 34 No. 9, pp. 281–283, Feb. 1992.

Bowater, R. J. & Butler, N. D., "Wideline Display of Standard VGA 5–Wide Characters", IBM Technical Disclosure Bulletin, vol. 34 No. 2, pp. 367–370, Jul. 1991.

"Bt475 Bt477", Brooktree Product Data Book 1991, Copyright 1990. Brooktree Corporation.

"IMS G177", Preliminary Specification SGS–Thomson Microelectronics, Apr. 1991.

*Primary Examiner*—Jack B. Harvey
*Assistant Examiner*—John Travis
*Attorney, Agent, or Firm*—Heslin & Rothenberg; Wayne F. Reinke

[57] ABSTRACT

Video subsystem power savings are achieved by shutting off power to unused subcircuits during blanking. Digital circuitry within the video subsystem not used during blanking is shut-down by turning off the clock thereto. Analog circuitry within a digital to analog converter is shut-down by turning off the constant current reference thereto. A functional unit containing digital circuitry within a serializer palette digital to analog converter (SPDAC) is shut-down by turning off the clock thereto during system operation in a mode where the functional unit is not utilized. A computer system having a monochrome display saves power by shutting off DAC digital circuitry clocks and DAC analog circuitry constant current references of all DACs but one. A portable computer with a liquid crystal display (LCD), a SPDAC for driving an external display and a LCD controller, saves power by shutting down video subsystem functional units and analog DAC circuitry not used for driving the LCD. Digital circuitry within the LCD controller is shut-down when an external display is being driven. In a portable computer operating in a SUSPEND state, video subsystem functional units are shut-down.

17 Claims, 5 Drawing Sheets fig. 1
PRIOR ART fig. 2
PRIOR ART fig. 3
PRIOR ART fig. 4
PRIOR ART fig. 5 fig. 6

METHOD AND APPARATUS FOR POWER MANAGEMENT IN VIDEO SUBSYSTEMS

BACKGROUND OF THE INVENTION

1. Technical Field

The present invention relates generally to power management in computer systems. More particularly, the present invention relates to power management in video subsystems of both portable and non-portable computers.

2. Background Art

Modern video subsystems have ever-increasing demands placed upon them. Pixel frequencies continue to increase, as well as the number of functions a video subsystem performs. As pixel frequencies and functionality increase, power requirements and power dissipation also increase. However, design changes to accommodate the increase in pixel frequencies and functionality of video subsystems have not optimized power savings and have left a lingering concern over wasted power. Although this concern exists with respect to non-portable computers, it is more acute in the portable computer market where such computers run off batteries. Extension of battery life has become a major customer concern.

Figure 1:
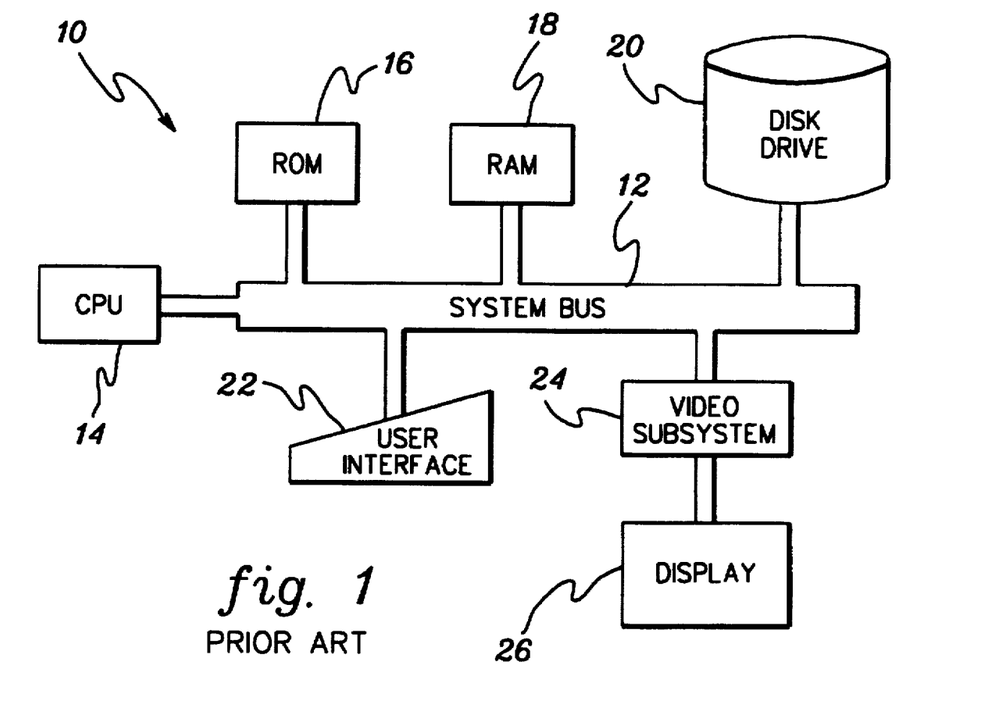
FIG. 1 is a block diagram of a workstation.

Computer graphics systems exist in many forms. An exemplary system is workstation 10 depicted in FIG. 1. Connected by system bus 12 are: CPU 14; read-only-memory (ROM) 16; random access memory 18; disk drive 20; a user interface 22, which could be a keyboard and/or a mouse; and video subsystem 24. A video subsystem is also known as a display adapter. A display device 26 is connected to the video subsystem 24. Such a graphics system is known in the art and details regarding its operation are therefore not necessary.

Figure 2:
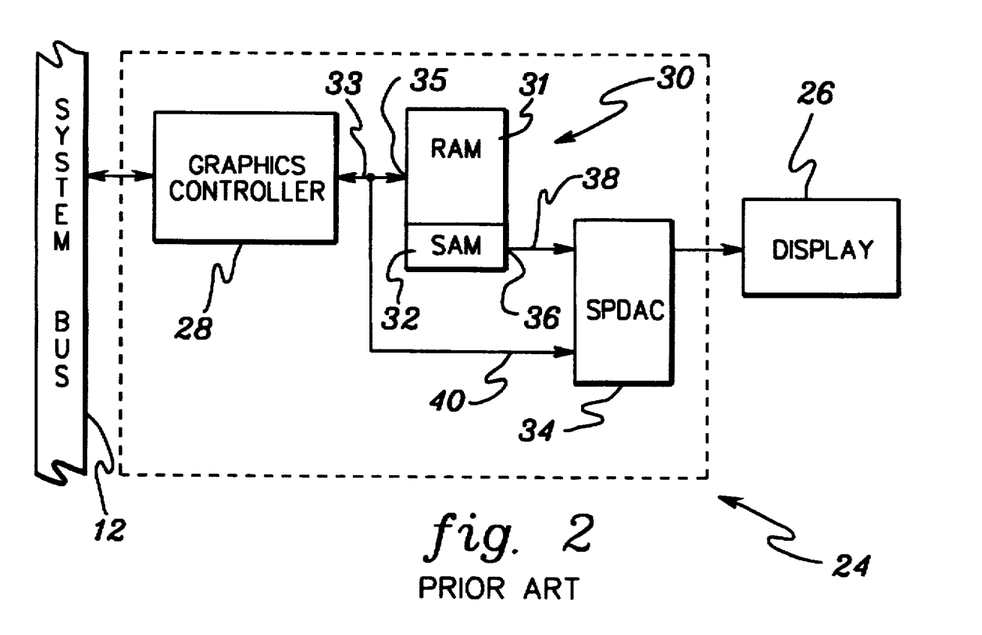
FIG. 2 is a block diagram of the video subsystem of FIG. 1.

Video subsystem 24 is depicted in expanded block diagram form in FIG. 2 and comprises a graphics controller 28, a dual port video random access memory (VRAM) 30 including a RAM portion 31 and a serial access memory (SAM) portion 32, and a serializer palette digital to analog converter (SPDAC) 34. Graphics controller 28 controls data transfers from RAM portion 31 of VRAM 30 to SAM portion 32 over line 33 and VRAM update port 35. Serial data is sent from RAM 31 to SAM 32 and out SAM port 36 to SPDAC 34 over line 38. Line 40 represents a programming interface to the SPDAC 34, which is also controlled by controller 28. The basic operation of such a video subsystem is well known in the art.

It is video subsystem 24, and SPDAC 34 in particular, where power dissipation is ripe for reduction. Power dissipation in a SPDAC chip, which is typically implemented with CMOS technology, includes both AC and DC components. As is known in the art, AC power dissipation is directly proportional to operating frequency. Thus, as operating frequency increases, so does power dissipation.

As is known in the art, power consumption in CMOS technology is approximated by the combination of standing power (i.e., when frequency is 0), and the product of a constant of proportionality, circuit capacitance, operating voltage squared, and operating frequency. Several of these power consumption components can be attacked to reduce power consumption. For example, operating voltage could be reduced, as in a move from 5 volt to 3 volt technology. Capacitance could also be reduced through better design or switching off unused circuits. In addition, standing power could be reduced through better design or switching off of the CMOS circuitry when not in use. Design changes involve costly replacement of hardware. Thus, while improved design may be practical in the future, the problem of power dissipation must be solved based on existing systems. The same is true with a move in operating voltage.

Prior art solutions to the problem of excess power dissipation in video subsystems include static power management. This type of solution only gives power savings when the video subsystem is inactive. For example, many SPDACs include a STANDBY-type mode of operation where analog power is shut-down, but the pixel clock remains running so that data can be input at all times. The clock remaining on wastes digital power needlessly. Some SPDACs also include a SLEEP-type mode of operation where both analog and digital power shut-down take place. However, the power savings are realized only during non-use. Static power management techniques simply do not address power savings during normal video subsystem operation.

Thus, a need exists for practical power management of existing video subsystems, without replacing already existing hardware and which provides power savings during normal operation.

DISCLOSURE OF THE INVENTION

Briefly, the present invention satisfies the need for video subsystem power management which provides power savings during normal operation without replacement of existing hardware by providing a method and apparatus for turning off subsystem circuitry when not needed or not in use.

In a first embodiment, a method and apparatus for dynamic power savings during display blanking is provided. A blanking signal is monitored for. In response to detection thereof, CMOS digital circuitry of functional units within the video subsystem not used during blanking are shut-down, as well as DAC analog circuitry. When the blanking signal is no longer detected, the functional units and the DAC analog circuitry are turned back on.

A method for functional power savings is disclosed in a second embodiment of the present invention based on the current system operating mode. During a given operating mode, a particular video subsystem functional unit may not be used. Thus, any functional unit not used during a given operating mode may be shut-down by shutting down the clock to its digital circuitry.

In a third embodiment of the present invention, a method and apparatus for power savings are disclosed for a computer system which may have either a monochrome or color display. A display signal is generated indicating which display type is present. In response to the display signal indicating a monochrome display is present, digital and/or analog circuitry within all digital-to-analog converters (DACs) but one is shut-down.

Portable computer systems having a liquid crystal display (LCD), a liquid crystal display controller (LCDC) for driving the LCD and a SPDAC for driving an external cathode ray tube (CRT) display may achieve additional power savings according to a method of a fourth embodiment of the present invention. When the LCDC drives the LCD, the SPDAC and all other video subsystem functional units not used when the LCD is being driven may be shut-down. Likewise, when the subsystem is driving an external CRT display, the LCDC may be shut-down.

In a fifth embodiment of the present invention, a portable computer system capable of operating in a SUSPEND state where no processing takes place and no display data is presented to the display may achieve further power savings. A signal indicating the SUSPEND state is about to be entered is monitored for. In response to detection of such a SUSPEND signal, functional units within the video subsystem not utilized during the SUSPEND state are shut-down. In response to system input, the video subsystem functional units are turned back on.

These, and other objects, features and advantages of this invention will become apparent from the following detailed description of the presently preferred embodiments of the invention taken in conjunction with the accompanying drawings.

BEST MODE FOR CARRYING OUT THE INVENTION

The video subsystem envisioned by the present invention includes a serializer palette digital to analog converter (SPDAC). The SPDAC has several subcircuits including digital CMOS circuitry. These subcircuits will be referred to herein as "functional units". Each functional units' digital circuitry operates according to a clock signal. The SPDAC also includes several DACs. Each DAC includes both digital circuitry and analog circuitry having a constant current reference associated therewith.

The video subsystem of the present invention also includes blanking periods, known in the art as time periods where no pixel data is presented on the display. Blanking periods comprise between 25% and 40% of total display time and take two forms. Horizontal blanking happens when the electron beam reaches the end of a display line and is returned to the beginning of the next display line. During this beam reset time, the phosphor is still energized so that the user does not see a blank screen. Vertical blanking happens when the beam reaches the bottom of the screen and is returned to the top. As in horizontal blanking, the user does not see an actual blank screen. Video subsystem power management according to the present invention includes both forms of blanking. Thus, where a "blanking period" is referred to, both horizontal and vertical blanking are included.

As is known in the art, during a blanking period, the DACs which send analog signals representing pixel colors to the display have zero output. This zero output can be achieved in two ways. The digital DAC circuitry can be zeroed (i.e., input data consisting of zeros), and then shut down retaining the zero data, so that the DAC analog output will remain zero. Alternatively, the analog DAC circuitry could be shut down, so that regardless of the contents of the DAC digital circuitry, no data is output from the DACs. Thus, the blanking zero output is achieved by either digital DAC zeroing and shut-down, or analog DAC shut-down, or preferably both. In achieving zero DAC output in this way, a significant power savings is also realized.

In a first embodiment of the present invention, a method for dynamically reducing power dissipation in a video subsystem, such as the video subsystem 24 depicted in FIG. 2, is provided. A blanking signal is generated by controller 28 during a blanking period. The generation of a blanking signal is known in the art. The method of the first embodiment begins by monitoring for such a blanking signal. In response to detecting a blanking signal, the power to subcircuits within the video subsystem which are not used during the blanking period is turned off. When the blanking signal is no longer detected, power to the subcircuits is restored.

Figure 5:
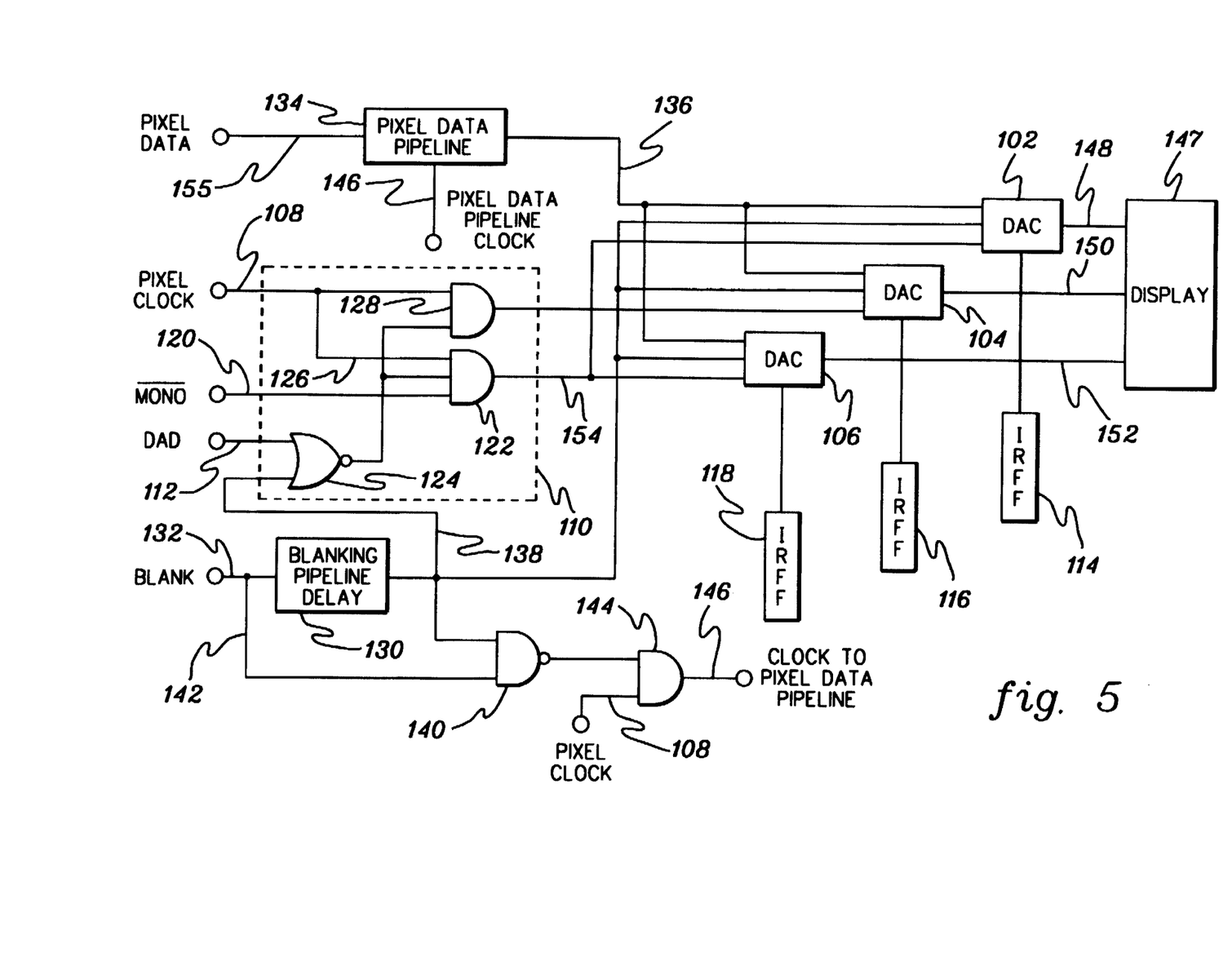
FIG. 5 is a partial block diagram of a video subsystem with exemplary circuitry for implementing digital circuitry shut-down during blanking and when a monochrome display is present.
Figure 6:
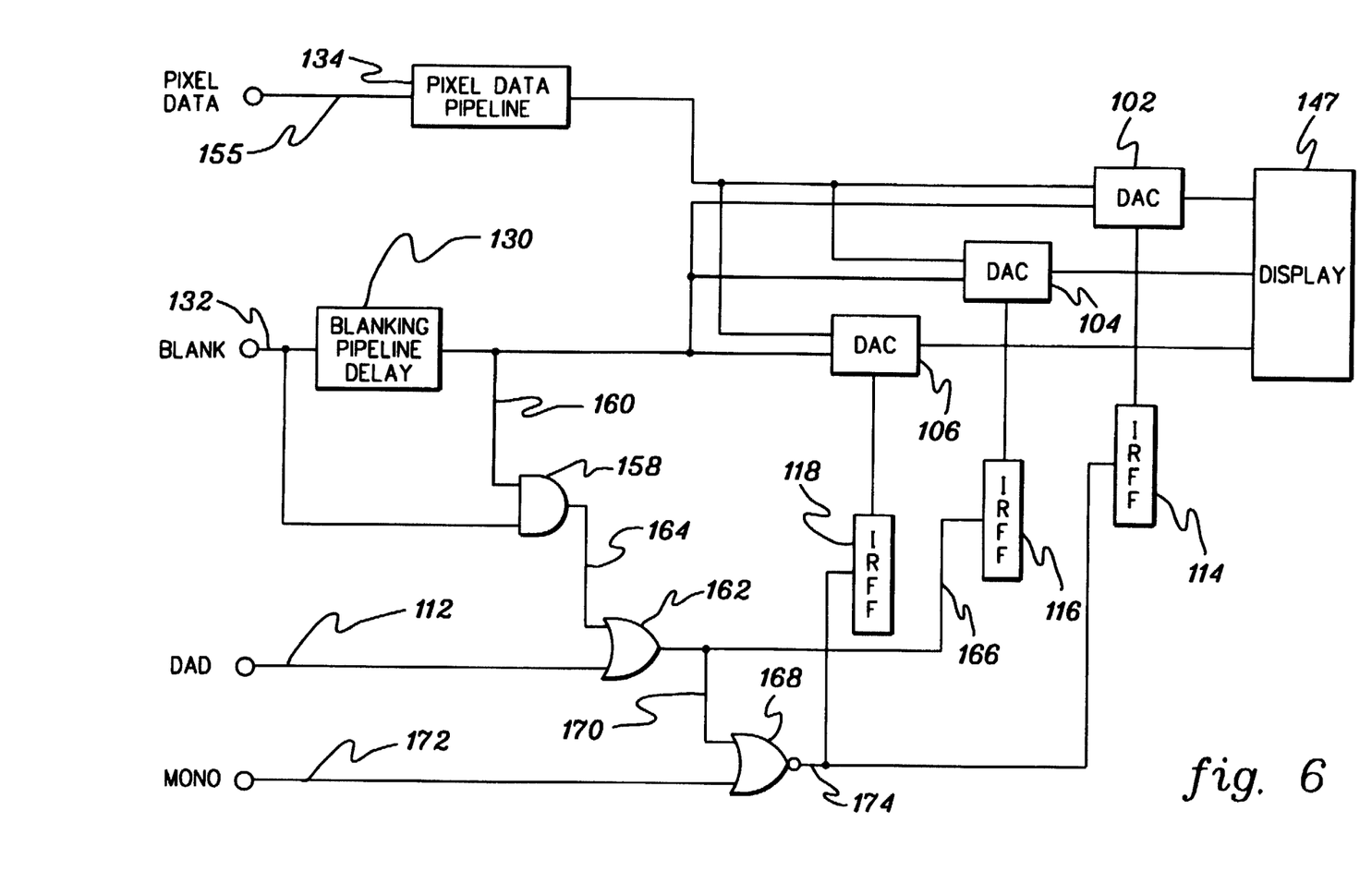
FIG. 6 is a partial block diagram of a video subsystem with exemplary circuitry for implementing DAC analog circuitry shut-down during blanking and when a monochrome display is present.

Subcircuits containing CMOS digital circuitry (i.e., functional units) can be turned off by turning off the clock signal that the digital circuitry requires to operate. Likewise, the digital circuitry can be turned back on by turning back on the clock signal. The digital to analog converters in a video subsystem that present analog display data to the display often have a constant current reference associated with the analog circuitry within them. With the constant current reference turned off, the DAC analog circuitry consumes almost no power. Thus, in the context of DAC analog circuitry in the first embodiment, turning off power to the analog circuitry can be accomplished by turning off the constant current reference associated therewith. Power to the DAC analog circuitry can be restored by turning the constant current reference back on. A specific example of circuitry to implement the first embodiment is shown in FIGS. 5 and 6, and will subsequently be described in greater detail.

Since blanking constitutes between 25% and 40% of total display time, the power management method of the first embodiment can save a like amount of power. The clocks to all digital circuitry not used during blanking and the constant current reference to the analog circuitry of each DAC are turned off during blanking. Clock and current reference shut-down effectively turns off the associated circuitry and saves power during blanking.

The method of the first embodiment also pertains to portable computers having a liquid crystal display (LCD) and being capable of displaying simultaneously on the LCD and an external CRT display. Such portable computers also have blanking periods so that the LCD and external CRT display are in synchronism. The LCD controller which controls the LCD has digital circuitry that can be shut down during blanking, just like the video subsystem digital circuitry in a non-portable computer system.

In a second embodiment of the present invention, a method for reducing power dissipation in a video subsystem based on operating mode is provided. The clock signal to a given functional unit can be shut off independent of other functional unit clock signals. In the simplest form, the video subsystem, according to the present invention, has two functional units and is capable of operating in two different operating modes. In the first operating mode, the first functional unit is utilized and the second is not. In the second mode, the second functional unit is utilized and the first is not. Thus, the current operating mode must be monitored for. In response to operation in the first operating mode, the clock to the first functional unit is turned on and the clock to the second functional unit is turned off. Likewise, in response to operation in the second operating mode, the clock to the second functional unit is turned on and the clock to the first functional unit is turned off.

Figure 3:
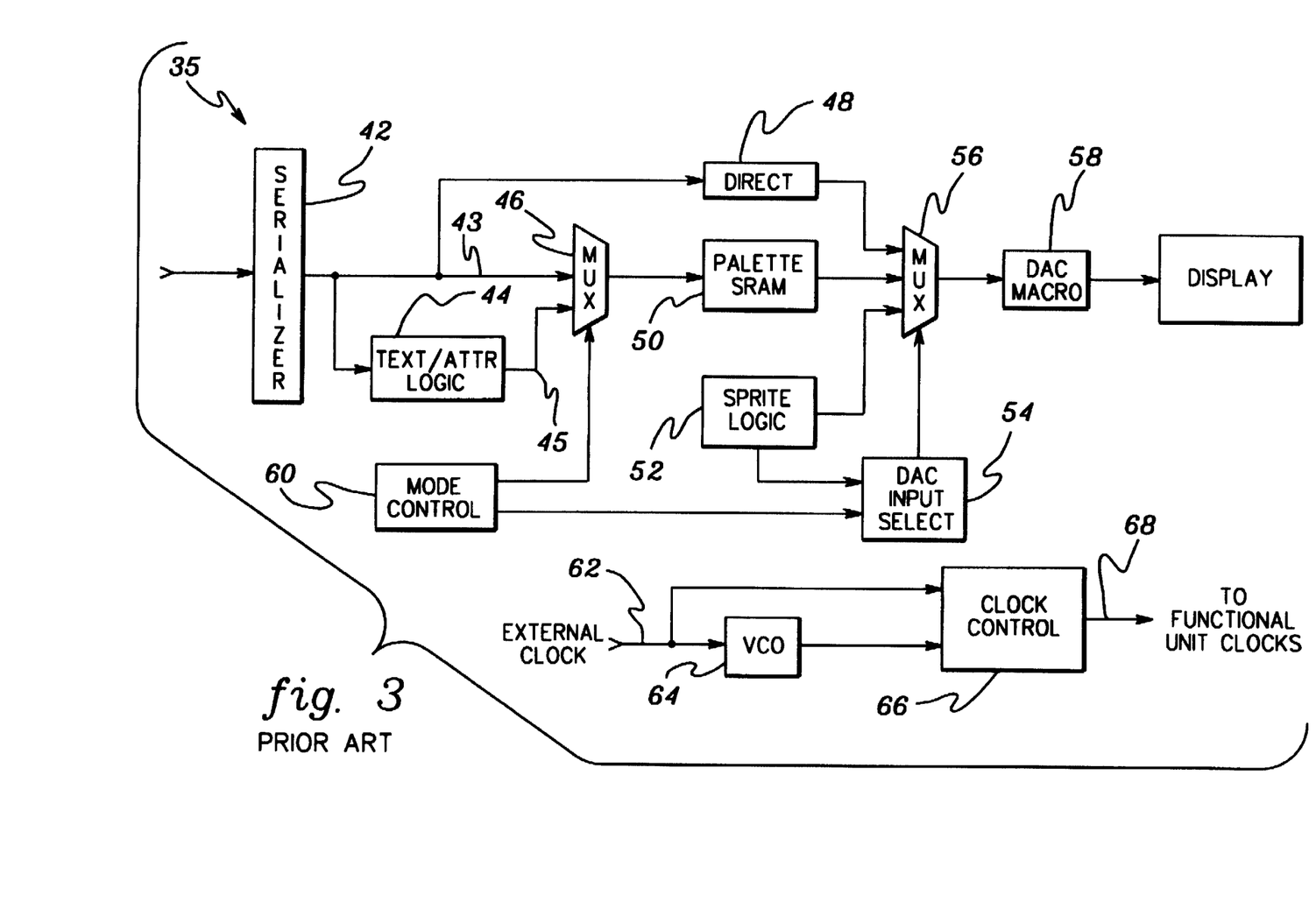
FIG. 3 is a block diagram of a commercially available serializer palette digital to analog converter useful in explaining a second embodiment of the present invention.

An example of the second embodiment of the invention will now be described. FIG. 3 is a block diagram representation of a commercially available SPDAC 35 that could be used, as an example, in the video subsystem 24 of FIG. 2. Serializer 42 takes data from SAM port 36 and converts it to a stream of information one pixel wide. Text/attribute logic 44 is logic that retrieves a text font and its attributes. Multiplexer 46 allows either direct serial data path 43 or text/attribute logic 44 output on line 45 to reach palette static RAM (PSRAM) 50 based on mode control 60. Direct color logic (DIRCOL) 48 bypasses the PSRAM 50, allowing direct color control without going through a color look-up table (i.e., PSRAM 50). Sprite logic 52 controls the graphics cursor on the display. Multiplexer 56 allows the output of DIRCOL 48, PSRAM 50, or sprite logic 52 to reach DAC macro 58 based on DAC input select 54. DAC macro 58 includes three DACs, one dedicated to producing an analog pixel display signal representing the color red, one for green and one for blue. The operation of SPDAC 35 is readily understood by one skilled in the art based on the above description.

Programming interface 40 of FIG. 2 is analogous to, in FIG. 3, the combination of mode control 60, an external clock signal available on line 62, voltage controlled oscillator 64, clock control 66 and an internal clock available on line 68. It will be understood that the clock control signal on line 68 is sent to each functional unit clock (not shown) within SPDAC 35. Clock control 66 merely allows for programming of the functional unit clocks.

SPDAC 35 comprises several subcircuits implemented in digital circuitry. Subcircuits which include digital circuitry will be referred to as "functional units." The functional units of SPDAC 35 include: serializer 42; PSRAM 50; DIRCOL 48; text/attribute logic (TATR) 44; and sprite logic (SPRLO) 52. SPDAC 35, and most SPDACs, operate in several different modes. For example, SPDAC 35 has, among others, a text mode and two graphics modes. In any given mode, not all the functional units are utilized. Thus, during a given mode, a functional unit not used can be shut-down by turning off its clock, yielding a significant digital power savings.

In text mode, serializer 42, PSRAM 50 and TATR 44 are operating, while DIRCOL 48 and SPRLO 52 are not. Thus, DIRCOL 48 and SPRLO 52 may be shut-down (i.e., may have their clocks turned off) during operation in text mode. It will be understood that although not typically done, SPRLO 52 could be operating in text mode.

Similarly, in the first graphics mode serializer 42 and PSRAM 50 operate. DIRCOL 48, TATR 44 and SPRLO 52 may be shut down. In the second graphics mode, serializer 42 and DIRCOL 48 operate, while PSRAM 50, TATR 44 and SPRLO 52 may be shut down. It will be understood that SPRLO 52 could be operated in either graphics mode.

In a third embodiment of the present invention, the computer system includes either a color display or a monochrome display. Power savings are possible when a monochrome display is used and the video subsystem is capable of supporting either a color display or a monochrome display. If the video subsystem supports a color display, typically several DACs will be included, one DAC for each basic color supported. For example, many video subsystems have one DAC for red, one DAC for green and one DAC for blue. When a monochrome screen is used, only one DAC needs to be operating.

The method of the third embodiment begins by generating a display signal which indicates whether a color display or a monochrome display is being used in the computer system. It will be understood that whether a color display or a monochrome display is used in the computer system can be discerned by, for example, system software or by the user inputting which type of display is present. Preferably, the presence of such a display signal indicates a monochrome display is being used in the system and the absence of such a display signal indicates that a color display is being used. The display signal is monitored for, and in response to the display signal indicating a monochrome display is present, the power to all DACs but one is turned off.

As previously stated, the DACs within the video subsystem of the present invention include both digital and analog circuitry. Thus, for maximum power savings both digital and analog circuitry are shut-down when a monochrome display is present. The clock to the digital circuitry within each DAC not used is turned off in order to turn off the digital circuitry therein. Likewise, the constant current reference to the analog circuitry within each DAC not used is shut-down in order to shut-down the analog circuitry therein. A specific example of circuitry to implement the third embodiment is shown in FIGS. 5 and 6, and will subsequently be described in greater detail.

In a fourth embodiment of the present invention, a method for reducing power dissipation in a video subsystem within a portable computer system is presented. The portable computer system includes a liquid crystal display (LCD) and a LCD controller (LCDC) for driving the LCD. Larger portable computers are often used in the office as well as away from the office. These portables are run in the office on AC power and may be connected to an external cathode ray tube (CRT) display. Such portable computer systems include a SPDAC for driving the external CRT display. When the LCD is used, the SPDAC and any other video subsystem functional units used to drive the external CRT display need not be operational since the LCD takes digital data and not analog data. Likewise, when the computer drives an external CRT display, the LCDC need not be operational.

Figure 4:
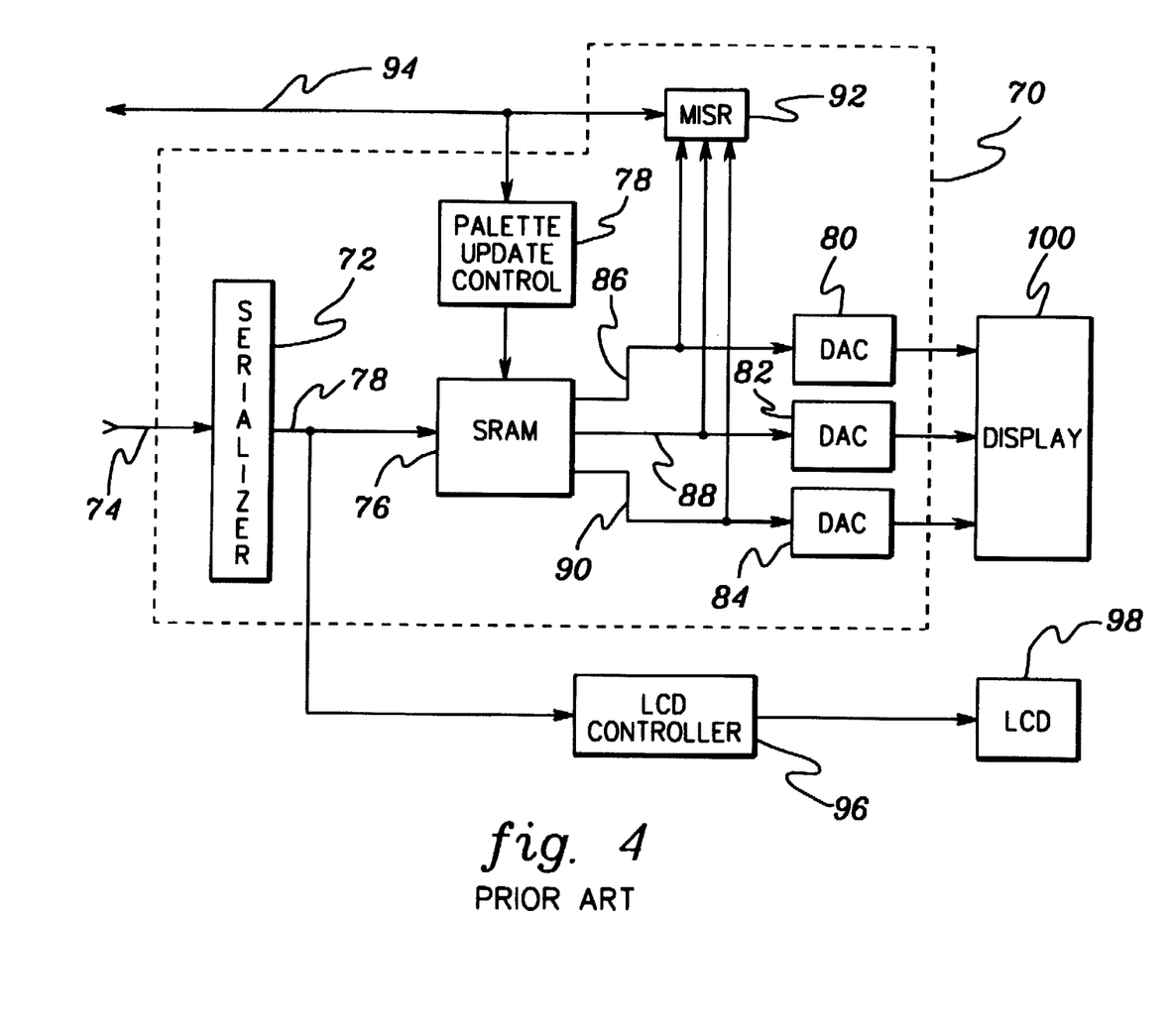
FIG. 4 is a general block diagram of a serializer palette digital to analog converter and a liquid crystal display controller useful in explaining a fourth embodiment of the present invention.

An example of this fourth embodiment will now be presented. FIG. 4 is a general block diagram of a SPDAC 70. Video data from the VRAM serial port (SRAM port 36 in FIG. 2) goes into serializer 72 over line 74. The output of serializer 72 goes to palette SRAM (PSRAM) 76 over line 78. Palette update control 78 controls PSRAM 76. DACs 80, 82 and 84 receive the digital output of PSRAM 76 over lines 86, 88 and 90, respectively. Also receiving the output from PSRAM 76 is multiple input shift register (MISR) 92. MISR 92 is a functional unit utilized for diagnostics. Palette update control 78 and MISR 92 are controlled over programming interface 94 (line 40 in FIG. 2). Also shown in FIG. 4 is LCD controller 96 which controls LCD 98. If an external CRT display 100 is being driven, then LCDC 96 need not operate. Likewise, if LCD 98 is being driven, SPDAC 70 need not operate.

The method of the fourth embodiment begins by generating a display signal which indicates whether a LCD or an external CRT display is sought to be driven. As with the third embodiment, it will be understood that which type of display is being driven can be, for example, read by system software or input by the user. Preferably, the display signal indicates the LCD is sought to be driven. The absence of the display signal indicates that an external CRT display is sought to be driven. All functional units and other subcircuits of the video subsystem not utilized during the normal operation of the portable computer system (i.e., functional units and subcircuits used in driving the external CRT display) are shut off in response to the display signal indicating that the LCD is sought to be driven.

The LCDC 96, palette update control 78, PSRAM 76 and MISR 92 are functional units. Although DACs 80, 82 and 84 are functional units, they also contain analog circuitry having an associated constant current reference thereto. As in the first embodiment, functional units can be shut-down by turning off their clock and analog circuitry having an associated constant current reference can be shut off by shutting off the constant current reference. Thus, when the display signal indicates that an external CRT display is sought to be driven, LCDC 96 may be shut off. When the display signal indicates that LCD 98 is sought to be driven, all functional units and analog circuitry having a constant current reference thereto used to drive an external CRT display may be shut-down. In the context of FIG. 4, functional units including DACs 80, 82 and 84, PSRAM 76, palette update control 78 and MISR 92 are shut-down. In addition, analog circuitry within DACs 80, 82 and 84 are shut-down as well. It will be understood that circuitry similar to that shown in FIGS. 5 and 6 could be used to implement the fourth embodiment.

Portable computer systems, as is known in the art, are often capable of entering into a SUSPEND state during which no processing takes place. During the SUSPEND state, the LCD or other external CRT display is blank.

In a fifth embodiment of the present invention, a SUSPEND signal is generated indicating that a SUSPEND state is about to be entered. The SUSPEND signal is monitored for, and in response thereto all functional units within the video subsystem are turned off. When there is input to the computer, power to the functional units within the video subsystem is restored. As in prior embodiments, the functional units are turned off by turning off the clock thereto and turned on by turning on the clock.

Although not typically part of a SPDAC chip, the so-called cathode ray tube controller (CRTC) in a portable computer system is part of the video subsystem 24 generally found in controller 28, and may benefit from SPDAC digital power management. Often, SPDAC chips are the clock source to the CRTC functional unit, since the CRTC clock typically has a period that is a multiple of the pixel clock period. When a portable computer enters a SUSPEND state, there is no reason to operate any functional unit involved in video display. Thus, the CRTC can be shut-down when the SPDAC clock sources are turned off during the SUSPEND state.

FIG. 5 is a block diagram representation of a SPDAC and logic circuitry that could be used, as an example, for power management according to the first and third embodiments of the present invention. According to the first embodiment, a power savings is available if the DACs are shut-down in synchronism with the applied display timings (i.e., during blanking periods). According to the third embodiment, a power savings is achieved when all DACs but one are shut-down in response to a monochrome display being used in the system.

DACs 102, 104 and 106 each have a high-speed digital front end that decodes the applied digital pixel data from pixel data pipeline 134 and controls the DAC analog output.

In some SPDAC chips, the DACs also have a multiple input shift register (MISR) (not shown) associated therewith, as in FIG. 4. Typically, the MISR is used for functional diagnostics and operates at high-speed. The DACs and the MISR, where present, operate at high pixel frequencies to achieve high speed. As previously noted, digital CMOS power dissipation is proportional to operating frequency. Thus, shut-down of the DAC and MISR digital circuits during blanking periods, comprising 25% to 40% of total display time, would provide a proportional amount of digital power savings. Digital shut-down is accomplished by cutting off the pixel clock signal, available on line 108, to the DACs 102, 104 and 106.

To optimize total power savings during blanking periods, digital DAC shut-down (i.e., functional unit shut-down) is preferably done in conjunction with analog DAC shut-down according to the first embodiment. Logic subcircuit 110 is one way to accomplish digital DAC shut-down.

The DAC Analog Disable (DAD) signal, available on line 112, disables the DAC constant current references 114, 116 and 118. Apparatus for disabling the constant current references will be described subsequently. When there is a DAD signal, the pixel clock signal to the digital portions of the DACs should be cut off to accomplish digital DAC shut-down synchronously with analog DAC shut-down. An inverted MONO signal is provided on line 120 to logical AND unit 122 and indicates a color display is present in the system. Also provided to logical AND unit 122 is the inverted output of logical OR unit 124. In addition, the pixel clock signal is provided to logical AND unit 122 on line 126. Logical AND unit 128 has the pixel clock signal on line 108 and the inverted output of logical OR unit 124 as inputs thereto. Blanking pipeline delay 130 merely delays the blanking signal available on line 132 to be in synchronism with the output of pixel data pipeline 134 available on line 136 to DACs 102, 104 and 106. The delayed blanking signal is sent to logical OR unit 124 on line 138, logical AND unit 140, and DACs 102, 104 and 106.

Logical AND unit 140 also has as an input the undelayed blanking signal available on line 142. The inverted output of logical AND unit 140 is sent to logical AND unit 144, which also has as an input the pixel clock signal available on line 108. The output of logical AND unit 144 acts as the clock to the functional units in pixel data pipeline 134 over line 146. The output of DACs 102, 104 and 106 is sent to display 147 over lines 148, 150 and 152, respectively.

The digital portion of DAC 104 operates (i.e., a clock signal is provided thereto) only when there is a pixel clock signal on line 108 and a combination of no DAD signal (reference currents on) and no delayed BLANK signal (blanking is not in progress). It is the same for DACs 102 and 106, except that an inverted MONO signal must also be present in order for their digital portions to operate (i.e., receive a clock signal on line 154). Thus, DACs 102 and 106 only operate with a color display. The clocks to DACs 102, 104 and 106 are turned off for digital power savings after the DACs have converted the last active pixel of a display period and turned on again when the first active pixel of the next display period must be converted.

The digital power savings given by DAC and MISR (if present) shut-down by clock kill during blanking can be expanded to include all functional units of the SPDAC. However, the SPDAC functional units aside from the DACs encounter blanking at different times, as they are physically spread across the pixel data pipeline 134. Although it would be possible to phase the onset of blanking shut-down across the pixel data pipeline, the additional complex circuitry would save little more power than a less complex unphased blanking shut-down.

The clock to the pixel data pipeline 134 on line 146 is turned off after the last active pixel of a display period has passed through the pixel data pipeline 134 to DACs 102, 104 and 106. The blanking signal is delayed through the blanking pipeline 130 to coincide with the last active pixel timing. The clock to the pixel data pipeline is then turned on at the first active pixel of the next display period entering the pixel data pipeline 134 on line 155, which coincides with the end of the blanking signal on line 132.

The DAC analog circuits in a SPDAC have constant reference currents that maintain the DACs in an active state and able to quickly respond. Frequently, SPDACs have the ability to shut off their DAC constant current references. Where this ability is available, a significant savings in analog power can be achieved.

DAC analog power management according to the first and third embodiments achieves power savings by controlling the DAC analog reference currents. In the first embodiment, the reference currents are shut-down during blanking, and in the third embodiment, all reference currents but one are shut-down when a monochrome display is present in the system.

Displays typically have what are known as blanking periods. During these blanking periods, the DACs provide a zero output, equivalent to their output when their reference currents are shut off. It has been found that, statistically, blanking constitutes between 25% and 40% of the display time. A proportionate amount of DAC analog power can be saved if the constant current references to the DACs are turned off during all blanking periods. It will be understood that the constant current references may be shut-down by either positive or negative going shut-down signals, depending on design.

However, as is known in the art, DACs require time, on the order of several pixel periods, to recover from major changes in the applied reference current. In light of the required recovery time, the DAC reference currents may be turned off after the last active pixel of a display period leaves the DACs and turned on as the first active pixel of the next display period enters the pixel data pipeline in order to compensate for the DAC recovery time.

FIG. 6 is a block diagram representation of a SPDAC and logic circuitry that can be used, as an example, for power management according to the first and third embodiments of the present invention. Comparing FIG. 6 with the SPDAC 35 of FIG. 3, pixel data pipeline (PDAP) 134 would comprise serializer 42, TATR 44, multiplexer 46, DIRCOL 48, PSRAM 50, SPRLO 52, DAC input select 54 and multiplexer 56. In short, PDAP 134 represents a SPDAC, exclusive of the DAC macro (shown as DACs 102, 104 and 106 in FIG. 5). Each DAC has a constant reference current (114, 116 and 118, respectively) associated therewith. Blanking pipeline delay (BLPIP) 130 merely delays the blanking signal present on line 132 to be in sync with PDAP 134 output.

Logical OR unit 158 has as inputs thereto the blanking signal on line 132 and the delayed blanking signal on line 160 out of the blanking pipeline delay 130. The output of logical AND unit 158 is sent to logical OR unit 162 over line 164. The other input to logical OR unit 162 is the DAD signal available on line 112. As previously described, the DAD signal indicates that the analog circuitry of DACs 102, 104, 106 should be disabled. The output of logical OR unit 162 is sent to constant current reference 116 over line 166 and acts as the shut-off signal to constant current reference 116. The output of logical OR unit 162 is also sent to logical OR unit 168 over line 170. The MONO signal, indicating a monochrome screen is present in the computer system, is also sent to logical OR unit 168 over line 172. The output of logical OR unit 168 is sent to constant current references 114 and 118 over line 174, and acts as the shut-off signal thereto. Thus, constant current references 114 and 118 are shut-down during blanking, when a DAD signal is present, and when a monochrome display is present in the computer system. It will be understood that the DAD and MONO signals may be generated, for example, as outputs of registers that are loaded with either a 1 or a 0 by controller 28 or CPU power management software.

Method and apparatus for power management of both analog and digital circuitry in a video subsystem have been described herein. Power management, according to the present invention, is possible in both portable and non-portable computers, as well as their display devices. Preferably, all applicable implementations of power management embodiments described herein are used in combination to achieve the greatest power savings.

While presently preferred embodiments of the invention have been described and depicted herein, alternative embodiments may be effected by those skilled in the art to accomplish the same objectives. Accordingly, it is intended by the appended claims to cover all such alternative embodiments as fall within the true spirit and scope of the invention.

We claim:

1. A method for dynamically reducing power dissipation in a computer system including a display and a video subsystem including a serializer palette digital to analog converter having a plurality of subcircuits, said subsystem generating a blanking signal during a blanking period wherein no pixel data is displayed, said blanking signal having a beginning and an end, said method comprising:

monitoring for a blanking signal beginning;

turning off power to each of said plurality of subcircuits of said serializer palette digital to analog converter not used during said blanking period in response to said blanking signal beginning;

monitoring for a blanking signal end; and restoring power to said each of said plurality of subcircuits not used during said blanking period in response to said blanking signal end.

2. The method of claim 1, wherein said plurality of subcircuits includes a functional unit comprising digital circuitry operating according to a clock signal, and said step of turning off power comprises preventing said clock signal from reaching said digital circuitry.

3. The method of claim 2, wherein said step of restoring power comprises allowing said clock signal to reach said digital circuitry.

4. The method of claim 1, wherein said plurality of subcircuits includes a digital to analog converter having a constant current reference associated therewith, and said step of turning off power comprises turning off said constant current reference.

5. The method of claim 4, wherein said step of restoring power comprises turning on said constant current reference.

6. A method for reducing power dissipation in a video subsystem within a computer system which may include a color display or a monochrome display, said video subsystem including a plurality of digital to analog converters (DACs), each of said plurality of DACs generating an analog signal representing a particular color, said method comprising:

generating a display signal indicating whether a color display or a monochrome display is present in said computer system;

monitoring for said display signal indicating a monochrome display is present in said computer system; and     turning off power to all but one of said plurality of DACs in response to said display signal indicating a monochrome display is present in said computer system.

7. The method of claim 6, wherein each of said plurality of DACs includes digital circuitry operating according to a clock signal, and said step of turning off power comprises preventing said clock signal from reaching said digital circuitry within said all but one of said plurality of DACs.

8. The method of claim 6, wherein each of said plurality of DACs includes analog circuitry having a constant current reference associated therewith, and said step of turning off power comprises turning off each said constant current reference associated with said analog circuitry within said all but one of said plurality of DACs.

9. Apparatus for dynamically reducing power dissipation in a computer system including a video subsystem and a display having one or more blanking periods wherein no pixel data is displayed, said video subsystem including a serializer palette digital to analog converter having a plurality of subcircuits, each of said plurality of subcircuits performing one or more functions unnecessary during said one or more blanking periods, said video subsystem generating a blanking signal during a blanking period, said blanking signal having a beginning and an end, said apparatus comprising:

means for monitoring for said blanking signal beginning;

means for turning off power to each of said plurality of subcircuits of said serializer palette digital to analog converter in response to said blanking signal beginning;

means for monitoring for said blanking signal end; and means for restoring power to each of said plurality of subcircuits in response to said blanking signal end.

10. The apparatus of claim 9, wherein said plurality of subcircuits includes one or more functional units including digital circuitry operating according to a clock signal, said means for turning off power comprises means for preventing said clock signal from reaching said digital circuitry and said means for restoring power comprises means for allowing said clock signal to reach said digital circuitry.

11. The apparatus of claim 9, wherein said plurality of subcircuits includes one or more DACs, each of said one or more DACs includes analog circuitry having a constant current reference associated therewith, said means for turning off power comprises means for turning off said constant current reference to each said one or more DACs, and said means for restoring power comprises means for turning on said constant current reference to each said one or more DACs.

12. Apparatus for reducing power dissipation in a video subsystem within a computer system which may include a color display or a monochrome display, said video subsystem including a plurality of DACs, each of said plurality of DACs generating an analog signal representing a particular color, said apparatus comprising:

means for generating a display signal indicating whether a color display or a monochrome display is present in said computer system;

means for monitoring for said display signal indicating a monochrome display is present in said computer system; and     means for turning off power to all but one of said plurality of DACs in response to said display signal indicating a monochrome display is present in said computer system.

13. The apparatus of claim 12, wherein each of said plurality of DACs includes digital circuitry operating according to a clock signal, and said means for turning off power to all but one of said plurality of DACs comprises means for preventing said clock signal from reaching said all but one of said plurality of DACs.

14. The apparatus of claim 12, wherein each of said plurality of DACs includes analog circuitry having a constant current reference associated therewith, and said means for turning off power to all but one of said plurality of DACs comprises means for turning off each said constant current reference associated with said analog circuitry within said all but one of said plurality of DACs.

15. Apparatus for dynamically reducing power dissipation in a video subsystem within a computer system, said video subsystem including a pixel data pipeline wherein pixel data is prepared for display and output to each of a plurality of DACs, each of said plurality of DACs including digital circuitry operating according to a pixel clock signal and analog circuitry having a constant current reference associated therewith, each of said plurality of DACs producing an analog signal representing a particular color for a color display, said subsystem also including a blanking pipeline wherein a blanking signal is delayed to be in synchronism with said output of said pixel data pipeline, said delayed blanking signal being output to each of said plurality of DACs, said apparatus comprising logic circuitry with an output coupled to at least one of said plurality of DACs and which prevents said pixel clock signal from reaching said digital circuitry within said at least one of said plurality of DACs when said delayed blanking signal is received by said at least one of said plurality of DACs, wherein said plurality of DACs comprises three DACs, wherein said output of said logic circuitry is coupled to one of said three DACs, and wherein said logic circuitry has another output coupled to the other of said three DACs and which prevents said pixel clock signal from reaching said other of said three DACs when said video subsystem is driving a monochrome display.

16. Apparatus for dynamically reducing power dissipation in a video subsystem within a computer system, said video subsystem including a pixel data pipeline wherein pixel data is prepared for display and output to each of a plurality of DACs, each of said plurality of DACs including analog circuitry having a constant current reference associated therewith, each of said plurality of DACs producing an analog signal representing a particular color for a color display, said subsystem also including a blanking pipeline wherein a blanking signal is delayed to be in synchronism with said output of said pixel data pipeline, said delayed blanking signal being output to each of said plurality of DACs, said apparatus comprising     logic circuitry with an output coupled to at least one said constant current reference and which turns off said at least one said constant current reference when said delayed blanking signal is received by at least one of said plurality of DACs associated with said at least one said constant current reference.

17. The apparatus of claim 16, wherein said plurality of DACs comprises three DACs, wherein said output of said logic circuitry is coupled to one said constant current reference, and wherein said logic circuitry has another output coupled to each said constant current reference associated with the other of said three DACs and which turns off each said constant current reference associated with the other of said three DACs when said video subsystem is driving a monochrome display.

\* \* \* \* \*